(12) United States Patent
Lecerf et al.

(10) Patent No.: US 6,234,663 B1
(45) Date of Patent: May 22, 2001

(54) HAND-HELD HOUSEHOLD ELECTRICAL APPLIANCE, IN PARTICULAR FOOD MIXER

(75) Inventors: Joel Lecerf, Periers; Jean-Jacques Linger, Laval, both of (FR)

(73) Assignee: Moulinex S.A., Cormelles-le-Royal (FR)

(*) Notice: Subject to any disclaimer, the term of this patent is extended or adjusted under 35 U.S.C. 154(b) by 0 days.

(21) Appl. No.: 09/600,900

(22) PCT Filed: Jan. 22, 1999

(86) PCT No.: PCT/FR99/00140

§ 371 Date: Jul. 24, 2000

§ 102(e) Date: Jul. 24, 2000

(87) PCT Pub. No.: WO99/37195

PCT Pub. Date: Jul. 29, 1999

(30) Foreign Application Priority Data

Jan. 23, 1998 (FR) .................................................. 98 00742

(51) Int. Cl.[7] .................................................. A47J 43/07
(52) U.S. Cl. .................................................. 366/129; 366/344
(58) Field of Search .................................................. 366/129, 297, 366/300, 301, 344; 310/50, 68 A

(56) References Cited

U.S. PATENT DOCUMENTS

| 2,605,085 | * | 7/1952 | Gerry . | |
| 2,705,619 | * | 4/1955 | Lockwood . | |
| 2,737,371 | | 3/1956 | Gerry . | |
| 2,931,632 | * | 4/1960 | Angelis et al. . | |
| 2,974,935 | * | 3/1961 | Smader . | |
| 3,341,181 | * | 9/1967 | Chambers et al. . | |
| 3,443,795 | * | 5/1969 | Gresens et al. . | |
| 3,595,093 | * | 7/1971 | Du Bois et al. . | |
| 3,619,754 | * | 11/1971 | Fuchs . | |
| 3,660,741 | * | 5/1972 | Walter . | |
| 3,725,624 | | 4/1973 | Emmons . | |
| 4,620,796 | * | 11/1986 | Moores | 366/344 |
| 5,332,310 | * | 7/1994 | Wells | 310/50 |
| 5,871,278 | * | 2/1999 | Harry et al. | 366/129 |
| 6,079,865 | * | 6/2000 | Plavcan et al. | 366/129 |

FOREIGN PATENT DOCUMENTS

| 1 654 887 | | 3/1971 | (GB) . | |
| 1527305 | * | 10/1978 | (GB) | 366/129 |
| 96/25080 | * | 8/1996 | (WO) | 366/129 |

\* cited by examiner

*Primary Examiner*—Charles E. Cooley
(74) *Attorney, Agent, or Firm*—Young & Thompson

(57) ABSTRACT

An appliance comprises a housing containing an electric motor whereof the output shaft is designed for driving a working tool, a switch controlling the motor speed which is actuated by a hand-operated control knob mounted rotating about an axis of rotation to take up an "off" position and several "on" positions, and a device for ejecting the tool capable of being controlled by the knob in its "off" position. The button is also mounted tilting about an axis transverse to its axis of rotation so as to control the actuating of the tool ejecting device. The appliance is particularly applicable to hand-operated electric food mixers.

10 Claims, 3 Drawing Sheets

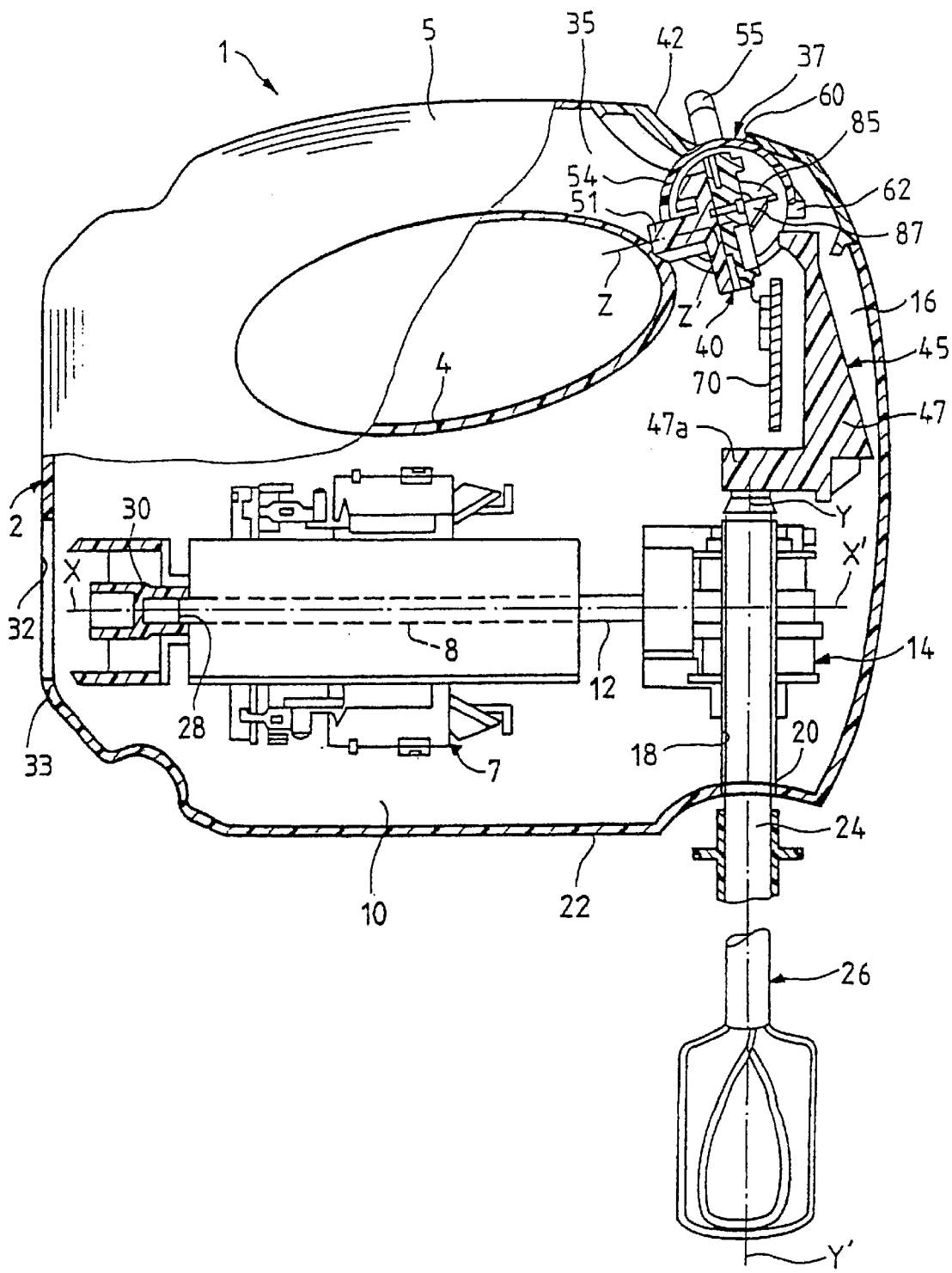
FIG_1

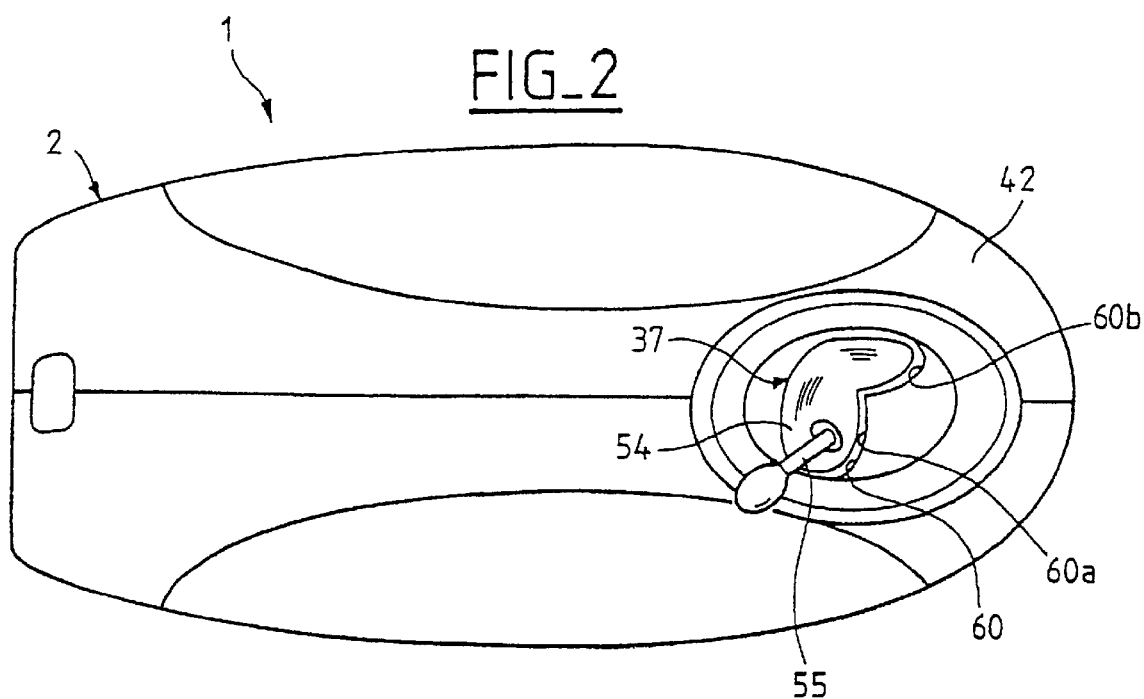
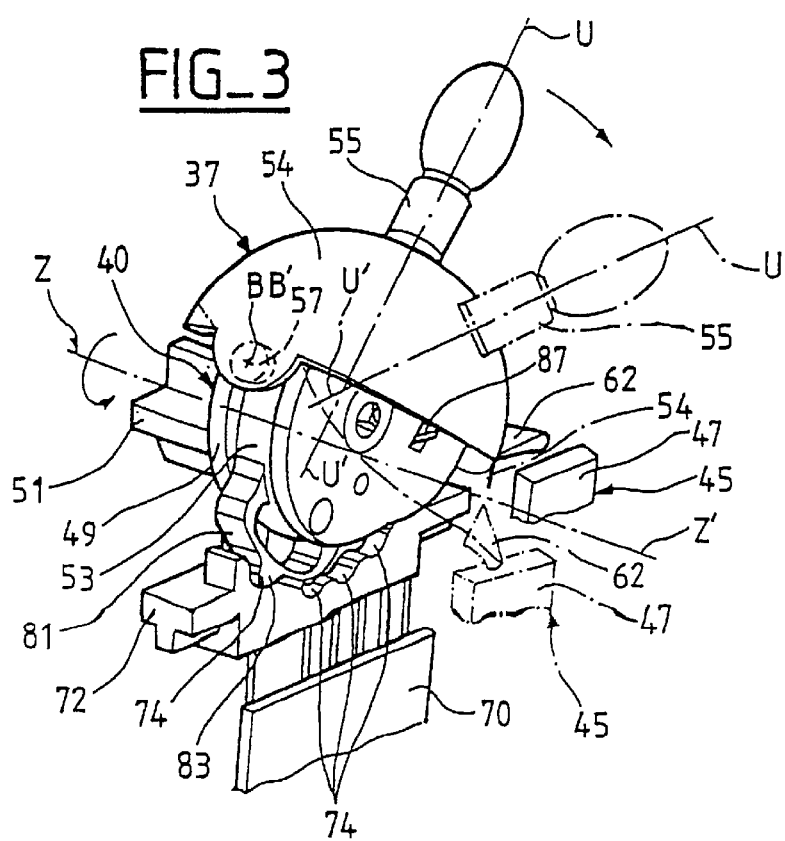

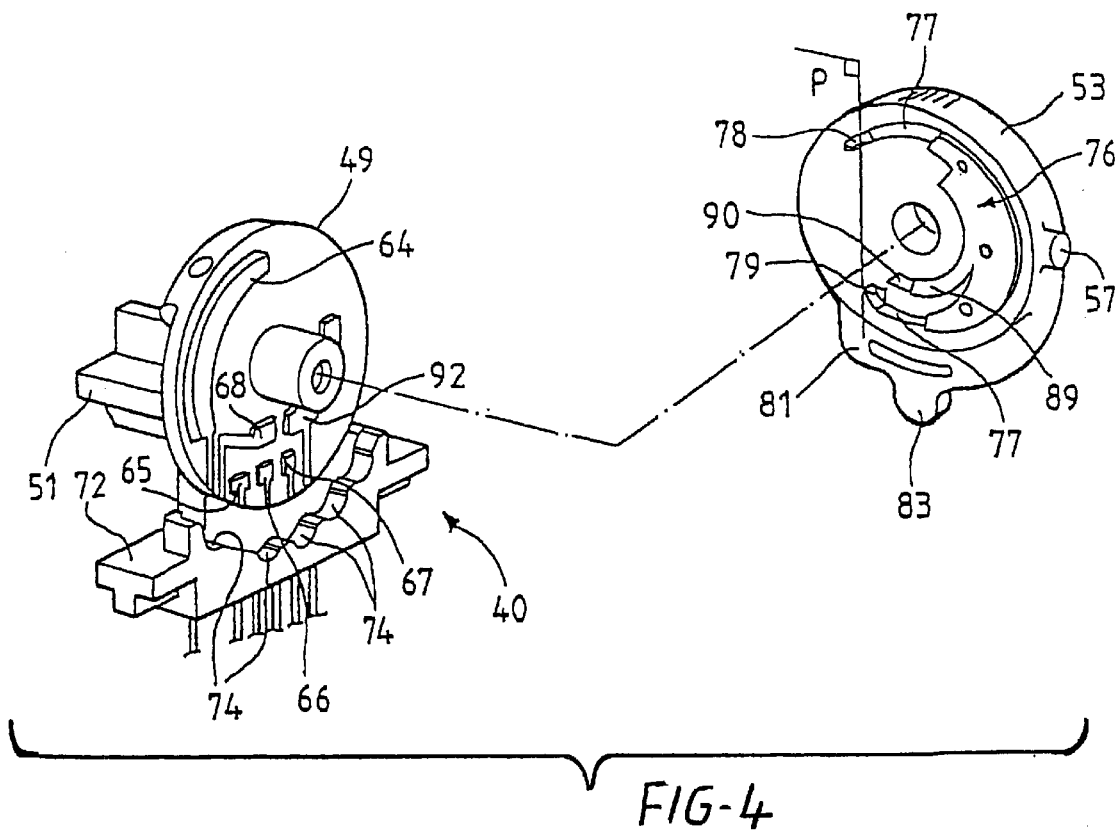
FIG-4
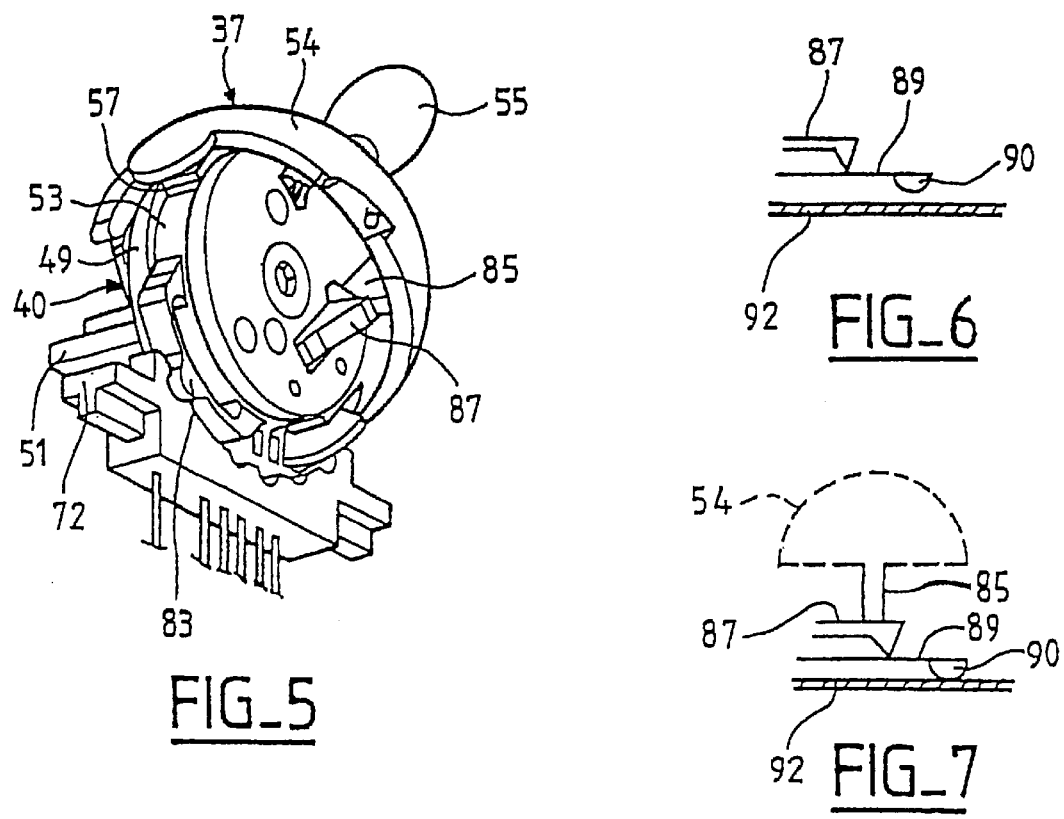
FIG_5  FIG_6  FIG_7

HAND-HELD HOUSEHOLD ELECTRICAL APPLIANCE, IN PARTICULAR FOOD MIXER

CROSS REFERENCE TO RELATED APPLICATION

This is the 35 USC 371 national stage of International application PCT/FR99/00140, filed on Jan. 22, 1999, which designated the United States of America.

FIELD OF THE INVENTION

The present invention relates to an electric hand-held kitchen appliance, adapted to drive at least one working tool, comprising a housing enclosing an electric motor whose output shaft is adapted to drive the working tool having an axle of which one end is inserted in an opening provided in the housing, a speed control switch for the motor which is actuated by a manually operable button rotatably mounted along an axis of rotation so as to be able to occupy a "stop" position or several angularly offset "operating" positions, and a device for ejecting the working tool which is controllable by the button in the "stop" position.

It is particularly applicable, but not exclusively, to an electric hand-held beater adapted to drive at least one whisk or at least one kneader.

BACKGROUND OF THE INVENTION

In known electric kitchen appliances of this type, such as a hand-held beater, the manually actuated rotatable button is adapted, in addition to control the switch to regulate the speed of the motor, to control the ejector device for the whisks by means of a control mechanism, of the lever and cam type, and, to this end, is turned by the user beyond its "stop" position to control the actuation of the ejection device by the whisks. However, the ejection of the whisks being carried out in the same direction of movement of rotation of the button which permits control of the speed of the motor, it can be involuntarily used by the user when the latter turns the button in an untimely manner. Moreover, the manually operated rotatable button has a high angular swing to carry out both the control of speed of the motor and the control of ejection of the whisks, and as a result occupies a relatively large volume in the apparatus.

SUMMARY OF THE INVENTION

The invention has particularly for its object to overcome these drawbacks and to provide a hand-held electric kitchen appliance, of the type described above, in which the ejection of the working tool can be carried out easily and with precision in even the same stopped position of the manually-operated button.

According to the invention, the manually operated button is also swingably mounted about an axis transverse to its axis of rotation so as to control the actuation of the working tool ejector device.

Thus, the fact that the ejection of the working tool is carried out by a swinging movement of the button which is thus different from the rotation button of the latter, permits control of the speed of the motor, and requires on the part of the user a voluntary action on the button, which action is moreover particularly easy. Moreover, because of its double rotative and swinging movement, the manipulating button operates a reduced space in the apparatus.

According to another important characteristic of the invention, the manually operable button comprises a lug which directly actuates the ejector device for the working tool during swinging of the button. This direct actuation lug therefore constitutes a simple mechanical means, contrary to the complicated cam and lever mechanism according to the prior art, thus leading to less costly production of the manually operable button.

BRIEF DESCRIPTION OF THE DRAWINGS

The characteristics and advantages of the invention will become clearer from the description which follows, by way of non-limiting example, with reference to the accompanying drawings, in which:

FIG. 1 is a view partially in vertical cross-section of an electric hand-held kitchen appliance such as a beater-mixer, according to the invention;

FIG. 2 is a top plan view of the apparatus of FIG. 1;

FIG. 3 is a view on an enlarged scale and in perspective, of a manually operated button associated with a switch, this button being shown in one position for control of the speed of the motor (in full lines) and in a position to eject a working tool (in broken lines);

FIG. 4 is an exploded schematic perspective view of the switch of FIG. 3;

FIG. 5 is a view on an enlarged scale and in perspective, of the button associated with the switch, showing the actuation of a finger by a cam of the button when the latter occupies a position for controlling the speed of the motor; and FIGS. 6 and 7 are schematic views showing a conductive track and a movable contact respectively, not urged by the finger of the switch of FIG. 5 (FIG. 6) and urged by this same finger (FIG. 7).

DETAILED DESCRIPTION OF THE INVENTION

In the embodiment shown in FIG. 1, the electric hand-held kitchen appliance 1 is an electric hand-held beater-mixer adapted to drive selectively at least one beating tool, such as a whisk or a kneader, or a mixing tool turning at high speed, such as for example a rotatable helical mixer.

The hand-held beater-mixer 1 shown in FIG. 1 comprises a housing 2 of generally prismatic shape having a recessed portion 4 which delimits a handle 5, and enclosing an electric drive motor 7 provided with an output shaft 8 with an axis XX' and disposed in the lower portion 10 of the housing 2 extending horizontally therein.

The shaft 8 of the drive motor 7 carries at its forward end 12 an endless screw (not shown) which coacts with two helicoidal pinions each turning about a vertical axis YY' perpendicular to the axis XX', and which form with the latter a reducer 14. These two helicoidal pinions are located in the forward portion 16 of the housing and are connected respectively to two coupling devices 18 along the axis YY', of which only one is visible in FIG. 1, adapted respectively to receive, by insertion through two openings 20 provided in the base 22 of the housing 2, the two upper ends of the respective axles 24 of two beating tools, in this case two whisks 26 of which only one is shown in FIG. 1; these two whisks 26 can be fixed in the coupling devices 18 either side by side or one behind the other.

In a manner known per se, the rear end 28 of the shaft 8 of the drive motor 7 carries a rotatable drive 30 adapted to receive, by insertion through an opening 32 provided in the rear wall 33 of the housing 2, a mixing tool (not shown), such as for example a mixing foot.

As shown in FIG. 1, in the upper portion 35 of the housing 2, in the front part of the latter, is arranged a projecting manually operable button 37 which is rotatably mounted about an axis of rotation designated ZZ', transverse to the axis YY' of the whisks 26. This manual manipulating button 37 is adapted to actuate an electric switch 40 which places the motor 7 out of service and regulates its speed of rotation. Thus, the button 37 can occupy a "stop" position and one or several successive "operating" positions, for example three in number, disposed at a certain angle relative to each other, on the same side of the "stop" position, so as to constitute a control sector for the speed of motor 7, permitting, in this case, selecting three speed levels for the motor. These three positions of the electric switching of the switch 40 are indicated in the form of suitable marks on the upper wall 42 of the housing 2, in front of the button 37 for actuating the switch.

As regards FIG. 1, the beater-mixer comprises moreover an ejector device 45 for the whisks 26 which is controlled by the manually operated button 37 in its "stop" position. In this embodiment, the ejector device 45 is constituted by a movable ejection member 47 arranged vertically in the front portion 16 of the housing 2, between the button 37 and the two coupling devices 18. This ejection member 47 has a lower portion 47a which bears on the upper ends of the axles 24 of the two whisks 26, and is resiliently urged by a return spring (not shown) to pass from a low position in the absence of the whisks to a high position (FIG. 1) during mounting of the whisks, and inversely from this high position to the low position in which the ejection member 47 frees the whisks under the action of the manually operated button 37 in its "stop" position.

According to the invention, as shown in FIG. 3, the manually operated button 37 is also swingably mounted about an axis, designated BB' in FIG. 3, transverse to its rotation axis ZZ' so as to control the actuation of the ejection member 47 for the whisks 26.

In the embodiment shown in FIG. 4, switch 40, which will be described in detail hereafter, is of the rotatable type and is comprised by two external concentric disks secured against each other by any suitable coupling means, namely a fixed disk forming a support 49 provided axially of a shaft 51 mounted fixedly in the housing and constituting the rotation axis ZZ' of the button 37 (FIGS. 1 and 3), and a rotatable disk 53 forming the support for the switch made of insulating material and adapted to be driven in rotation by the manually operated button 37 when the latter is turned about its axis ZZ' to occupy its "stop" position or one of its "operating" positions.

In this example, as will be seen in FIGS. 1 and 3, the manually operated button 37 is shaped like a spherical cap 54 which is surmounted by a handle 55 of substantially cylindrical shape with an axis UU' (FIG. 3), and which is swingably mounted on its base on two pins 57, of which only one is visible in FIGS. 3 and 4, formed on the external periphery of the rotatable disk 53 of switch 40 and diametrically opposed to each other so as to constitute the swinging axis BB' (FIG. 3) of the spherical cap 54.

Preferably, the spherical cap 54 and the handle 55 of the manually operated button 37 are molded of a single piece of plastic material.

In this embodiment, the axis of rotation ZZ' and the swinging axis BB' of the spherical cap 54 of the button 37 are located in planes that are orthogonal to each other (FIG. 3).

As shown in FIGS. 1 and 2, the handle 55 of the manual operating button 37 projects from the upper wall 42 of the housing 2 through a cutout 60 provided in the housing, whilst the spherical cap 54 is mounted below this cutout 60 and is applied, with slight clearance play, against the internal surface of the upper wall 42 of the housing bordering the cutout 60, thereby forming a sealing joint.

The cutout 60, FIG. 2, comprises a first track 60a of arcuate form along which the spherical cap 54 of the button 37 can move, during rotation about its axis ZZ', to occupy successively its different "operating" positions, three in number in the selected example, corresponding respectively to the three predetermined levels of speed of the motor, as well as its "stop" position, and a second track 60b communicating with the first track 60a and extending beyond the latter and located at the level of the "stop" position of the button 37, so as to permit swinging about a wide angular path, of the cap 54 of the button 37, about its axis BB' (FIG. 3), when the button occupies its "stop" position in which it controls the actuation of the ejection member 47 for the whisk.

In a preferred embodiment, the cap 54 of the manually operated button 37 comprises at its base a lug 62 (FIGS. 1 and 3), preferably molded with the cap 54, which actuates directly the ejection member 47 for the whisks when the spherical cap 54 of the button 37 in the "stop" position is swung forwardly about its axis BB' (as shown in broken lines in FIG. 3), with the help of the handle 55 which is moved into the cutout 60 (FIG. 2) coming into abutment, at the end of swinging of the cap 54, against the forward edge of the track 60b of the cutout 60, this latter thereby serving as a limit to swinging movement. Under the direct action of the lug 62, the ejection member 47 passes from its high position to its low position in which it frees, by its lower portion 47a (FIG. 1), the whisks 26; after ejection of the whisks, the ejection member 47 is returned by its spring to its upper position.

Thus, thanks to this swinging movement of the cap 54 of the manually operated button 37, separate from the rotative movement of this latter to control the different speeds of the motor, the ejection of the whisks desirably requires on the part of the user a deliberate action, easily carried out, on the button 37, and this in the same stopped position of the button. Moreover, the lug 62 for directly actuating the ejection member 47 of the whisks constitutes a particularly simple and inexpensive member.

As to FIG. 4, the fixed disc 49 of the rotatable switch 40 comprises several fixed contacts formed by conductive areas distributed in the same arc of a circle, namely a so-called common track 64 and three tracks 65, 66 and 67 corresponding respectively, in the selected example, to the three predetermined speeds of the motor 7, as well as an internal conductive track 68, concentric to the preceding and corresponding to a high speed, so-called instantaneous operation, which is used for example for a mixing foot. The various tracks 64–68 are all electrically connected, in a manner known per se, to a printed circuit 70 (FIG. 1) which, in the example illustrated in FIG. 1, is mounted vertically in the housing 2. The disc 49, FIG. 4, is made of an insulating material in which are preferably overmolded the conductive tracks 64–68, and comprises at its lower portion a substantially parallelepipedal insulating bar 72, for example molded with the disc 49, extending into the housing 2 transversely to the shaft 51 and comprising on its forward face an angular sector with several indexing notches 74 corresponding respectively to the "stop" position and to the different "operating" positions of the manually operated button.

On the rotatable disc 35 of the switch 40, FIG. 4, is fixedly mounted, by any suitable securement means, a cursor 76 with flexible metallic blades 77 carrying at the end two movable contacts 78, 79 which are adapted respectively to coact with the common track 64 and with one of the three tracks 65, 66, 67 according to the "operating" position of the button 37. For purposes of clarity, there has not been shown the movable contact blade adapted to coact with the track 68 corresponding to the instantaneous speed of operation for a mixer foot. The contacts 78 and 79 extend in a same vertical plane designated P in FIG. 4. The disc 53 comprises in its lower portion a rounded tongue 81 having a vertically descending tooth 83 engaged successively, according to the rotation of the disc 53, in the different indexing notches 74 of the bar 72 according to the "stop" and "operating" positions of the manually operated button 37, see FIG. 3.

According to another aspect of the invention, the cap 54 of the manually operated button 37 is moreover adapted to swing about its axis BB' in each of the "operating" positions of the button, according to an angular path substantially less than that permitting controlling the ejection of the whisks, with the aid of the handle 55 which is moved into the cutout 60 (FIG. 2) coming into abutment, at the end of swinging of the cap 54, against the forward edge of the track 60a of the cutout 60, this latter serving to limit swinging. As shown in FIGS. 1 and 5, the cap 54 of the button 37 comprises internally a cam 85 that actuates, upon swinging of the cap 54 in each of the "operating" positions of the button, a finger 87 which is movably mounted in the rotatable disc 53 of the switch 40 (FIG. 5) and which actuates a flexible supplemental metallic blade 89 with a movable contact 90 (FIG. 4) located behind the plane P and coacting with a specific conductive track, designated 92 in FIG. 4, carried by the fixed disc 49 of the switch 40, so as to increase the speed of the motor during a short period, thereby facilitating, for example, incorporation of ingredients in the course of preparation of foodstuffs.

In FIG. 6, there is shown schematically the finger 87 in a rest position, defined before swinging of the cap 54 of the buttons 37 in each of its "operating" positions, and in which it bears on the metallic blade 89 carrying at its end the movable contact 90 located at a distance from the associated conductive track 92; in FIG. 7, there is shown this same finger 87 in a working position in which it is actuated by the cam 85 of the cap 54 of the button during swinging of this cap in each of its "operating" positions of the button, and in which it bends the metallic blade 89 so as to apply the movable contact 90 against the conductive track 92, thereby permitting increasing the speed of the motor.

It will be noted that the invention described above in the context of an electric hand-held beater-mixer is applicable also to any other type of hand-held electric kitchen appliance using ejection of the working tool and a variation of the speed of the motor, such as for example an electric knife or else an immersed mixer.

What is claimed is:

1. A hand-held electric kitchen appliance, adapted to drive at least one working tool, comprising:
   a housing enclosing an electric motor having an output shaft adapted to drive the working tool, which has an axle whose one end is inserted in an opening provided in the housing;
   a switch for controlling the speed of the motor which is actuated by a manually operated button rotatably mounted about an axis of rotation so as to occupy a "stop" position and several angularly related "operating" positions; and
   an ejector device for the working tool which is controllable by the button in said "stop" position;

wherein the manually operated button is also swingably mounted about a swinging axis transverse to said axis of rotation so as to control the actuation of the ejector device of the working tool.

2. The hand-held electric kitchen appliance according to claim 1, wherein the manually operated button comprises a lug that directly actuates the ejector device of the working tool during swinging of the button.

3. The hand-held electric kitchen appliance according to claim 1, wherein the switch is rotatable and comprises fixed electrical contacts formed by conductive areas distributed in the arc of a circle, and movable electric contacts each coacting with one of corresponding areas according to one of the "operating" positions of the button; and wherein the movable electric contacts are fixedly mounted in a rotatable switching support driven in rotation by the button; which button is moreover adapted to swing in each of said "operating" positions by being subjected to a swinging limiter, according to an angular path shorter than that which permits controlling the actuation of the ejector device, and the button comprises a cam which actuates by swinging of said button in each of said "operating" positions, a finger which is movably mounted in the switching support and which actuates a supplemental movable contact to cause the supplemental movable contact to coact with at least one of said conductive areas permitting increasing the speed of the motor for a short period.

4. The hand-held electric kitchen appliance according to claim 3, wherein the swinging limiter is constituted by a cutout provided in the housing, into which the button projects, and the swinging limiter comprises two areas communicating with each other, either a first area permitting swinging of the button when said button occupies each of said "operating" positions, or a second area extending beyond the first area and permitting amplified swinging of the button when said button occupies said "stop" position in which said button controls the actuation of the ejector device.

5. The hand-held electric kitchen appliance according to claim 4, wherein the button is shaped as a spherical cap surmounted by a handle.

6. The hand-held electric kitchen appliance according to claim 5, wherein the spherical cap is mounted below the cutout of the housing and is applied with a slight clearance play against the internal surface of the housing bordering said cutout, said spherical cap thus forming a sealing joint.

7. The hand-held electric kitchen appliance according to claim 3, wherein the conductive areas are disposed on a first support which is connected to the rotatable switching support and said first support comprises a shaft mounted fixedly in the housing and constituting the rotation axis of the button, said button being mounted articulately on two pins formed on the rotatable switching support and axially aligned so as to form the swinging axis of the button.

8. The hand-held electric kitchen appliance according to claim 7, wherein the axis of rotation and the swinging axis of the button are located in planes orthogonal to each other.

9. The hand-held electric kitchen appliance according to claim 7, wherein the first support is of insulating material in which are overmolded the conductive areas.

10. The hand-held electric kitchen appliance according to claim 1, wherein said appliance constitutes a hand-held electric beater.

* * * * *